Sept. 24, 1957  J. SCHULZE  2,807,276
STEAM TRAP WITH HAT-SHAPED FLOAT
Filed Jan. 24, 1951

INVENTOR
JOHANN SCHULZE
BY Richards & Geier
ATTORNEYS

United States Patent Office 2,807,276
Patented Sept. 24, 1957

2,807,276

STEAM TRAP WITH HAT-SHAPED FLOAT

Johann Schulze, Osterholz-Scharmbeck, Germany, assignor to Gustav F. Gerdts, Bremen, Germany Application January 24, 1951, Serial No. 211,619

4 Claims. (Cl. 137—185)

This invention relates to steam traps, and an object of the invention is to improve the construction and operation of prior art devices.

The invention will be apparent from the following description and drawing wherein:

Figures 1, 2, 3, and 4 are diagrammatic sections through various steam traps constructed in accordance with the present invention.

Figure 1:
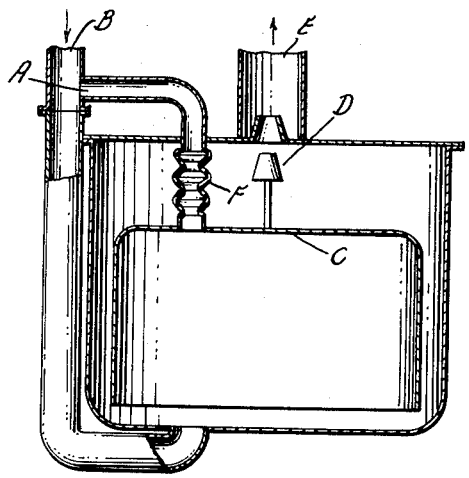
Figure 2:
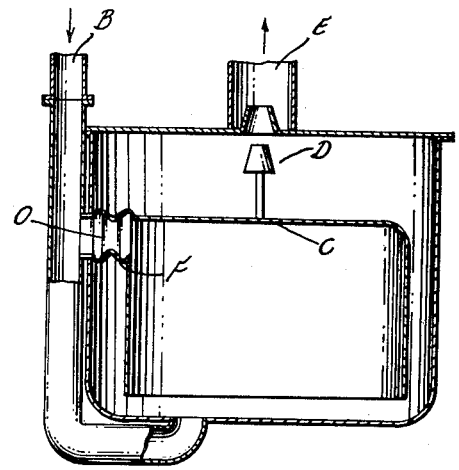

Steam trap shown in Figure 1 includes a casing having an inlet branch B through which water of condensation flows into the trap. The casing contains a hat-shaped float C which is adapted to move upwardly and downwardly. The water of condensation flows through the inlet branch B into the interior of the hat-shaped float C, entering into it from below, with the result that the float C moves up and down. The casing also carries the outlet branch E which is adapted to be closed by a valve D carried by the float C.

When the inflow of condensation water ceases steam will enter the hat-shaped float C. The pressure of steam will cause the float to rise, thereby closing the valve D until a new inflow of condensation water takes place as a result of which the float will move downwardly. The described construction is known in the art and it has the drawback that water might temporarily back up, producing a water hammer. In order to avoid this drawback, in accordance with the present invention the float C is connected with the inlet branch by an equalization line F which, in the example illustrated in Fig. 1, may consist, at least in part, of an elastic section. Steam, and if necessary air and gas, can flow through the equalization line F and rise in the inlet pipe, with the result that condensation water can be drained off without delay.

In the construction shown in Fig. 1 the float C moves up and down. In the construction shown in Fig. 2 the float C is connected by an elastic, horizontally disposed member F with the inlet B so that the float will swing about an axis O. The advantage of this connection is that the equalization line F is greatly reduced in length.

Figure 3:
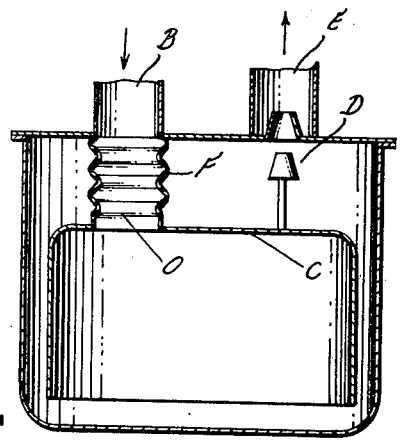

In the construction shown in Fig. 3 the inlet branch B and the equalization line F have been combined into a single passage of large area. This construction is advisable when buoying forces are available to overcome large frictional resistances.

Figure 4:
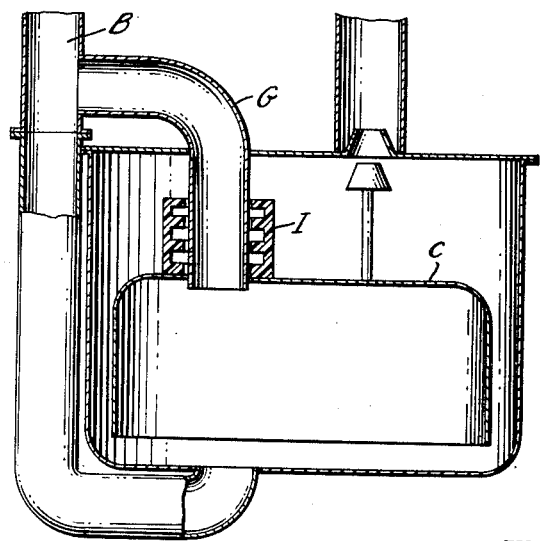

In the construction shown in Fig. 4 the elastic equalization line is replaced by a fixed tube G which branches off the inlet B. The tube G extends into the interior of the float C and a joint I provides an air-tight and water-tight seal between the float and the tube G. It is apparent that this seal may be of any suitable type, such as a labyrinth seal, a stuffing box or the like.

I claim:

1. A steam trap, comprising, in combination, a casing, a hat-shaped float in said casing, a valve carried by said casing and adapted to be closed by said float, an inlet branch connected with said casing and communicating with the bottom of said float, and an equalization line connecting the top of said float with said inlet branch and comprising a flexible connection member.

2. A steam trap in accordance with claim 1, wherein the sectional area of the equalization line is of a dimension large enough so that said equalization line simultaneously serves for the inflow of the water of condensation.

3. A steam trap, comprising, in combination, a casing, a hat-shaped float in said casing, a valve carried by said casing and adapted to be closed by said float, an inlet branch connected with said casing and communicating with the bottom of said float, and an equalization line connecting the top of said float with said inlet branch and comprising a fixed tube carried by said inlet branch and projecting into the interior of said float, and means sealing said tube relatively to said float.

4. A steam trap, comprising, in combination, a casing, a hat-shaped float in said casing, a valve carried by said casing and adapted to be closed by said float, an inlet branch connected with said casing and communicating with the bottom of said float, and means pivotally supporting said float within said casing and comprising sealed hollow links having a passage formed therein and connecting the interior of said float with said inlet branch.

References Cited in the file of this patent

UNITED STATES PATENTS

| | | |
|---|---|---|
| 167,854 | Nader | Sept. 21, 1875 |
| 1,006,043 | Arner | Oct. 17, 1911 |
| 1,198,918 | Holmberg | Sept. 19, 1916 |
| 1,309,604 | Armstrong | July 15, 1919 |
| 1,784,664 | Eickholt | Dec. 9, 1930 |
| 1,838,089 | Baker | Dec. 29, 1931 |
| 2,025,752 | Kaye | Dec. 31, 1935 |
| 2,406,214 | Garnier | Aug. 20, 1946 |

FOREIGN PATENTS

| | | |
|---|---|---|
| 83,605 | Germany | Oct. 28, 1895 |
| 310,985 | Great Britain | Apr. 30, 1929 |